(12) United States Patent
Roberson et al.

(10) Patent No.: US 8,131,969 B2
(45) Date of Patent: Mar. 6, 2012

(54) UPDATING SYSTEM CONFIGURATION INFORMATION

(75) Inventors: Randy L. Roberson, New Port Richey, FL (US); Clark Edward Lubbers, Colorado Springs, CO (US); Tarun Thakur, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1937 days.

(21) Appl. No.: 10/969,648

(22) Filed: Oct. 20, 2004

(65) Prior Publication Data

US 2006/0085626 A1    Apr. 20, 2006

(51) Int. Cl.
    *G06F 13/00*    (2006.01)
(52) U.S. Cl. .................... 711/170; 711/155; 711/167
(58) Field of Classification Search .............. 711/170, 711/155, 167
    See application file for complete search history.

(56) References Cited

U.S. PATENT DOCUMENTS

| | | | |
|---|---|---|---|
| 4,847,807 A | 7/1989 | Yule | |
| 5,285,451 A | 2/1994 | Henson et al. | |
| 5,325,363 A | 6/1994 | Lui | |
| 5,412,661 A | 5/1995 | Hao et al. | |
| 5,519,844 A | 5/1996 | Stallmo | |
| 5,537,567 A | 7/1996 | Galbraith et al. | |
| 5,544,339 A | 8/1996 | Baba | |
| 5,568,629 A | 10/1996 | Gentry et al. | |
| 5,632,027 A | 5/1997 | Martin et al. | |
| 5,671,349 A | 9/1997 | Hashemi et al. | |
| 5,682,509 A | 10/1997 | Kabenjian | |
| 5,708,769 A | 1/1998 | Stallmo | |
| 5,729,763 A | 3/1998 | Leshem | |
| 5,774,643 A * | 6/1998 | Lubbers et al. | 714/20 |
| 5,790,775 A * | 8/1998 | Marks et al. | 714/9 |
| 5,812,754 A | 9/1998 | Lui et al. | |
| 5,960,169 A | 9/1999 | Styczinski | |
| 6,101,615 A | 8/2000 | Lyons | |
| 6,154,853 A | 11/2000 | Kedem | |
| 6,154,854 A | 11/2000 | Stallmo | |
| 6,195,695 B1 | 2/2001 | Cheston et al. | |
| 6,219,753 B1 | 4/2001 | Richardson | |
| 6,247,157 B1 | 6/2001 | Edirisooriya | |
| 6,327,672 B1 | 12/2001 | Wilner | |
| 6,338,126 B1 | 1/2002 | Ohran et al. | |
| 6,353,895 B1 | 3/2002 | Stephenson | |
| 6,453,428 B1 | 9/2002 | Stephenson | |
| 6,457,140 B1 | 9/2002 | Lindberg et al. | |
| 6,473,830 B2 | 10/2002 | Li et al. | |
| 6,502,166 B1 | 12/2002 | Cassidy | |
| 6,529,994 B1 | 3/2003 | Bleidt et al. | |
| 6,557,123 B1 | 4/2003 | Wiencko, Jr. et al. | |
| 6,574,687 B1 | 6/2003 | Teachout et al. | |
| 6,675,176 B1 | 1/2004 | Shinkai et al. | |
| 6,675,318 B1 | 1/2004 | Lee | |
| 7,353,259 B1 * | 4/2008 | Bakke et al. | 709/208 |
| 2004/0049770 A1 * | 3/2004 | Chrysanthakopoulos et al. | 717/162 |
| 2004/0133506 A1 * | 7/2004 | Glodjo et al. | 705/37 |

* cited by examiner

*Primary Examiner* — Yong Choe
(74) *Attorney, Agent, or Firm* — Fellers, Snider, et al.

(57) ABSTRACT

A data storage system and associated method comprising system configuration information; a first processor adapted for identifying a portion of the system configuration information in response to a configuration change request to the memory space, and for signaling an update request incident with the configuration change request to a second processor; and a second processor adapted for updating the portion in response to the update request and independently of the first processor.

17 Claims, 9 Drawing Sheets

US 8,131,969 B2

UPDATING SYSTEM CONFIGURATION INFORMATION

FIELD OF THE INVENTION

The present invention pertains generally to the updating of system configuration information for a computer system and more particularly without limitation to multiple-processor updating for atomicity.

BACKGROUND

Computer systems can comprise input devices, output devices, one or more CPUs and storage devices that can include semiconductor RAM, EEPROM, disc drives, CD drives, other storage media, and can include intelligent controllers. An operating system can control configuration of various peripherals, such as display adapters and network interfaces, for example, and provides an application environment and a data system that allocates or de-allocates storage capacity as files are created, modified, or deleted. Specialized computer systems, such as servers and storage arrays, also employ a system for allocating storage capacity that can be accessed through a network or other connection. Data can be stored across a plurality of disc drives in redundant storage formats such as RAID, for example. User data, and any mirror data or parity data, is mapped to one or more areas on one or more disc drives. Configuration information describing the manner in which data is stored to one or more disc drives is contained in tables or other data structures termed metadata. As files are created, modified, or deleted, the metadata is updated to reflect the allocation or de-allocation of storage capacity.

The manner in which metadata describes storage mapping and how metadata is processed within a data storage system can have a significant impact upon storage system performance. As the storage capacity of a system grows, the amount of configuration information employed to manage the system can also grow, as does the amount of time needed to process information. The rate at which storage can be allocated or de-allocated, the number of concurrent processes supported, and the storage capacity of a system directly affects the marketability and value of the system.

SUMMARY OF THE INVENTION

As embodied herein and as claimed below, the present invention is generally directed to a device and associated method for updating computer system configuration information.

In some embodiments a method is provided comprising identifying candidate system configuration information associated with the configuration change request by a first processor; sending an update request incident with the configuration change request to a second processor; and updating the candidate system configuration information by the second processor in response to the update request and independently of the first processor.

In some embodiments a data storage system is provided comprising system configuration information associated with allocation of a memory space; a first processor adapted for identifying a portion of the system configuration information in response to a configuration change request to the memory space; and a second processor adapted for updating the portion in response to an update request incident with the configuration change request and independently of the first processor.

In some embodiments a data processing system is provided comprising system configuration information defining allocation of a memory space; and means for updating the system configuration information by sharing operations associated with a configuration update request across multiple processors.

These and various other features and advantages which characterize the embodiments of the claimed invention will become apparent upon reading the following detailed description and upon reviewing the associated drawings.

DETAILED DESCRIPTION

Figure 1:
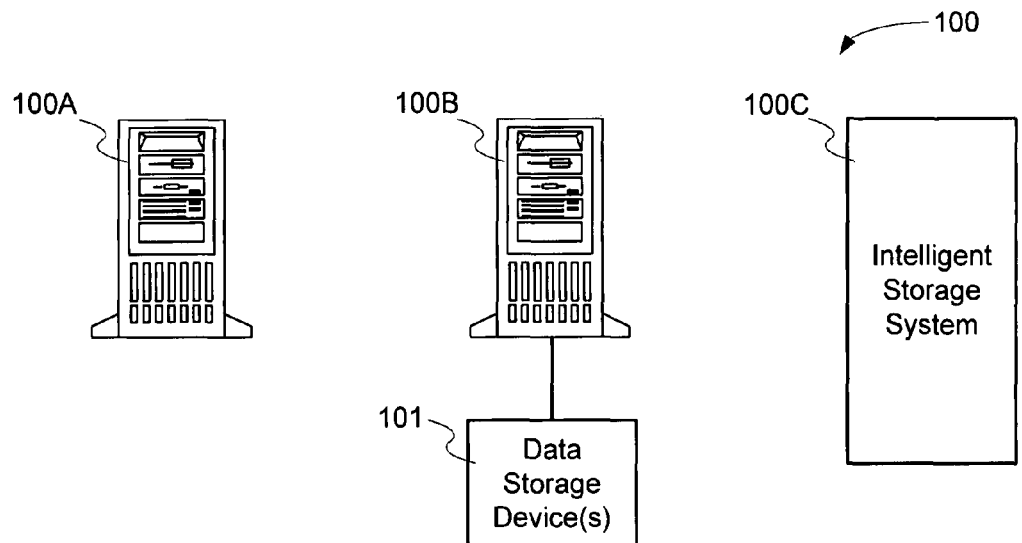
FIG. 1 is a diagrammatical depiction of exemplary operating systems in which various embodiments of the present invention can be employed.

FIG. 1 depicts exemplary operating systems in which embodiments of the present invention can be employed, such as in a computer 100A, or in a server 100B with internal or attached data storage devices 101, or in an intelligent storage system 100C. Intelligent storage system 100C is representative of storage systems that can have intelligent controllers and interfaces and that can have one or more data storage arrays.

Operating systems 100 each contain at least one central processing unit (CPU), a plurality of data storage devices 101 defining a data storage capacity, and metadata describing the configuration of the data storage capacity. By "configuration" it is meant that a description is provided to the system 100 regarding whether particular portions of the storage capacity are being used to store data, or "allocated" space, as opposed to the portions that are available for storing data, or "allocatable" space.

Other operating systems suited for use with various embodiments of the present invention include additional data storage devices 101, additional data storage arrays, additional data storage device controllers or network interface controllers, and the like, that are not depicted in FIG. 1. For example, embodiments of the present invention can be used in a system 100 that includes at least two data storage devices 101 and one controller. Embodiments of the present invention can be employed in simple systems having little or no fault tolerance redundancy to highly redundant systems having no single point of failure.

Figure 2:
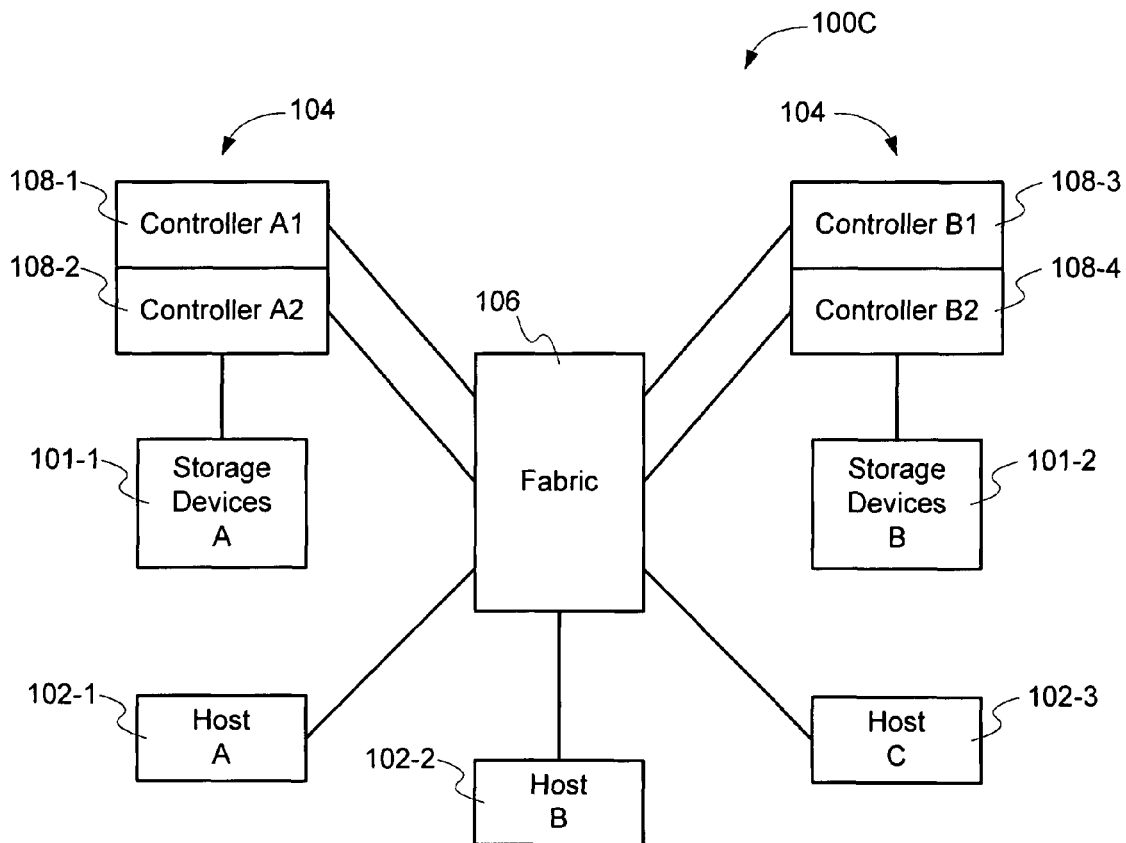
FIG. 2 is a top level functional block depiction of a computer-based system characterized as a wide-area network utilizing mass storage.

To illustrate an exemplary environment in which presently preferred embodiments of the present invention can be advantageously practiced, FIG. 2 shows a computer-based system 100C characterized as a wide area network (WAN) utilizing mass storage.

The system 100C includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well including the Internet.

Each array 104 includes a pair of controllers 108 (denoted A1, A2 and B1, B2) and a set of data storage devices 101 preferably characterized as disc drives operated as a RAID. The controllers 108 and data storage devices 101 preferably utilize a fault tolerant arrangement so that the various controllers 108 utilize parallel, redundant links and at least some of the user data stored by the system 100C is stored in a redundant format within at least one set of the data storage devices 101.

It is further contemplated that the A host computer 102 and the A data storage array 104 can be physically located at a first site, the B host computer 102 and B storage array 104 can be physically located at a second site, and the C host computer 102 can be yet at a third site, although such is merely illustrative and not limiting.

Figure 3:
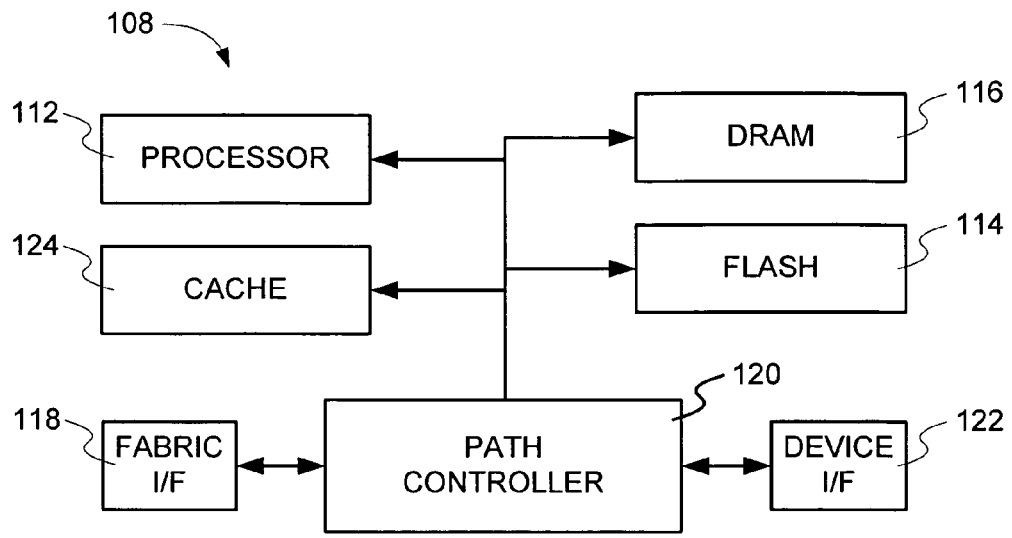
FIG. 3 provides a functional block diagram illustrating a selected one of the controllers of FIG. 2.

FIG. 3 illustrates a selected one of the controllers 108 in greater detail. The controller 108 can be embodied in a single integrated circuit, or distributed among a number of discrete circuits as desired. A main processor 112, preferably characterized as a programmable, computer processor, provides control in accordance with programming steps and processing data preferably stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 122 communicates with the storage devices 101. The I/F circuits 118, 122 and a path controller 120 form a communication path to pass commands and data between the storage array 104 and the host 102, such as by employing the cache memory 124. Although illustrated discretely, it will be understood that the path controller 120 and the I/F circuits 118, 122 can be unitarily constructed.

The data storage capacity of an array 104, defined by the extent of the data storage devices 101 in a given array 104, is organized into logical devices that can be written to and read from the array 104. System configuration information defines the relationship between user data, including any associated parity and mirror data, with the respective storage locations. The system configuration information furthermore identifies the relationship between blocks of storage capacity allocated to user data and the memory storage locations, such as logical block addresses (LBA). The system configuration information can furthermore include virtualization by defining virtual block addresses that are mapped to logical block addresses.

System configuration information is changed in response to a configuration change request from the system 100C. In response, storage capacity can be allocated, such as when saving new files or enlarging existing files, or storage capacity can be deallocated, such as when deleting files or reducing the size of existing files. For purposes of this description and the appended claims, the term "allocation" means either an allocation or deallocation of storage capacity. System metadata is resultant data defining file allocation information states and other data structures that support allocation processes.

Figure 4:
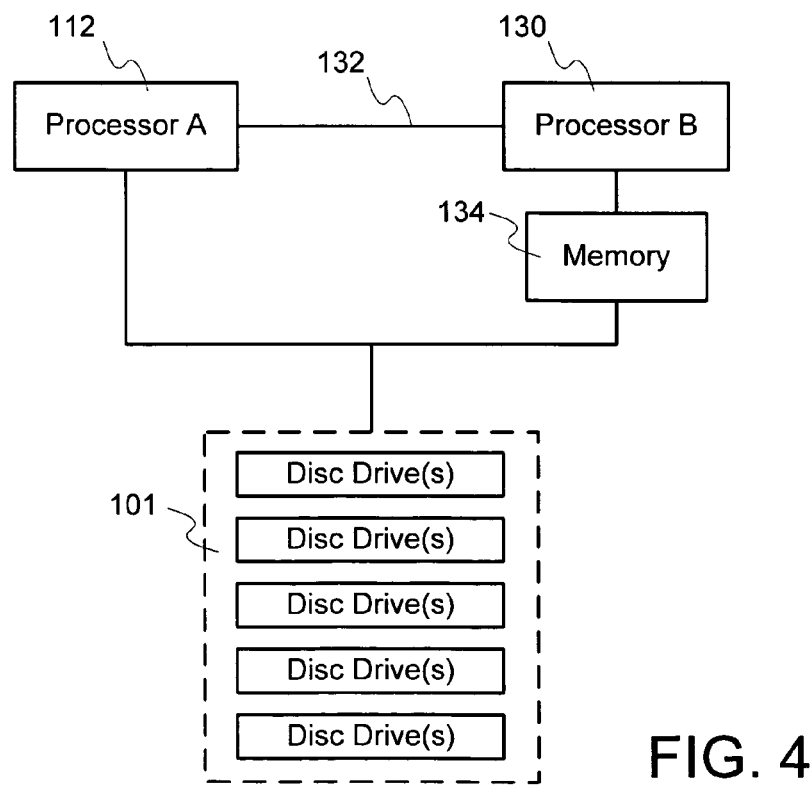
FIG. 4 provides a functional block diagram illustrating a dual-processor arrangement in accordance with embodiments of the present invention.

FIG. 4. depicts illustrative embodiments of the present invention employing a means for updating the system configuration information by utilizing multiple processors that share the operational steps associated with responding to the configuration change request. In these illustrative embodiments the processor 112 is adapted for identifying candidate system configuration information associated with a configuration change request, as described below. For purposes of this description and the appended claims, the term "candidate system configuration information" is a portion of the system configuration information that is associated with the configuration change request, such as by a logical device (LD), for example a logical disc, to which storage capacity is to be allocated. In this case, the candidate system configuration information could include all storage units that have been allocated to the particular LD associated with a configuration change request.

Continuing with the illustrative embodiments of FIG. 4, the processor 112 is coupled to a processor 130 such as by a bus 132 or other connection providing communication between the two. The processor 130 is preferably a dedicated metadata access processor (MAP). A memory 134 can be read from and written to by the processor 130. The processor 112 can transfer system configuration information, preferably in the form of metadata, from the data storage devices 101 to the memory 134. Memory 134 can be any type of memory such as DRAM, SRAM, or other memory, and can include parity, ECC, or other data encoding. In some embodiments memory 134 comprises a write-back cache memory with backup power, as may be supplied from a battery, for example. Processor 112 can page system configuration information (transfer a block of infoiniation) from drive array 104 into memory 134 using programmed I/O, a DMA controller, or other hardware and/or software methods.

Other equivalent embodiments of the present invention can include additional or other system components, such as additional data storage devices 101, additional arrays 104, and disc controllers or interface controllers, for example, that are not explicitly depicted herein. For example, in some embodiments processor 130 can be part of an intelligent controller such as a data storage device controller, interface controller, or other controller. Some embodiments can comprise the processor 112 and multiple intelligent controllers, each having an associated memory.

Again, system configuration information defining the allocation of storage capacity can be stored in the array 104. The form and content of the system configuration information can vary depending upon the organization of storage capacity into LDs and the manner in which user data and redundant data, such as mirror data or parity data, are distributed among the data storage devices 101.

Embodiments of the present invention furnish an architecture and methods for creating and modifying system configuration information. The system configuration information can control hardware configurations, such as operating modes of devices and peripherals, and/or software configurations including file systems and allocation of storage capacity in data storage systems. The following figures provide examples of system configuration information and processing thereof for a grid architecture storage system. However, applications of embodiments of the present invention are not limited to specific storage system or system configuration information formats.

Figure 5:
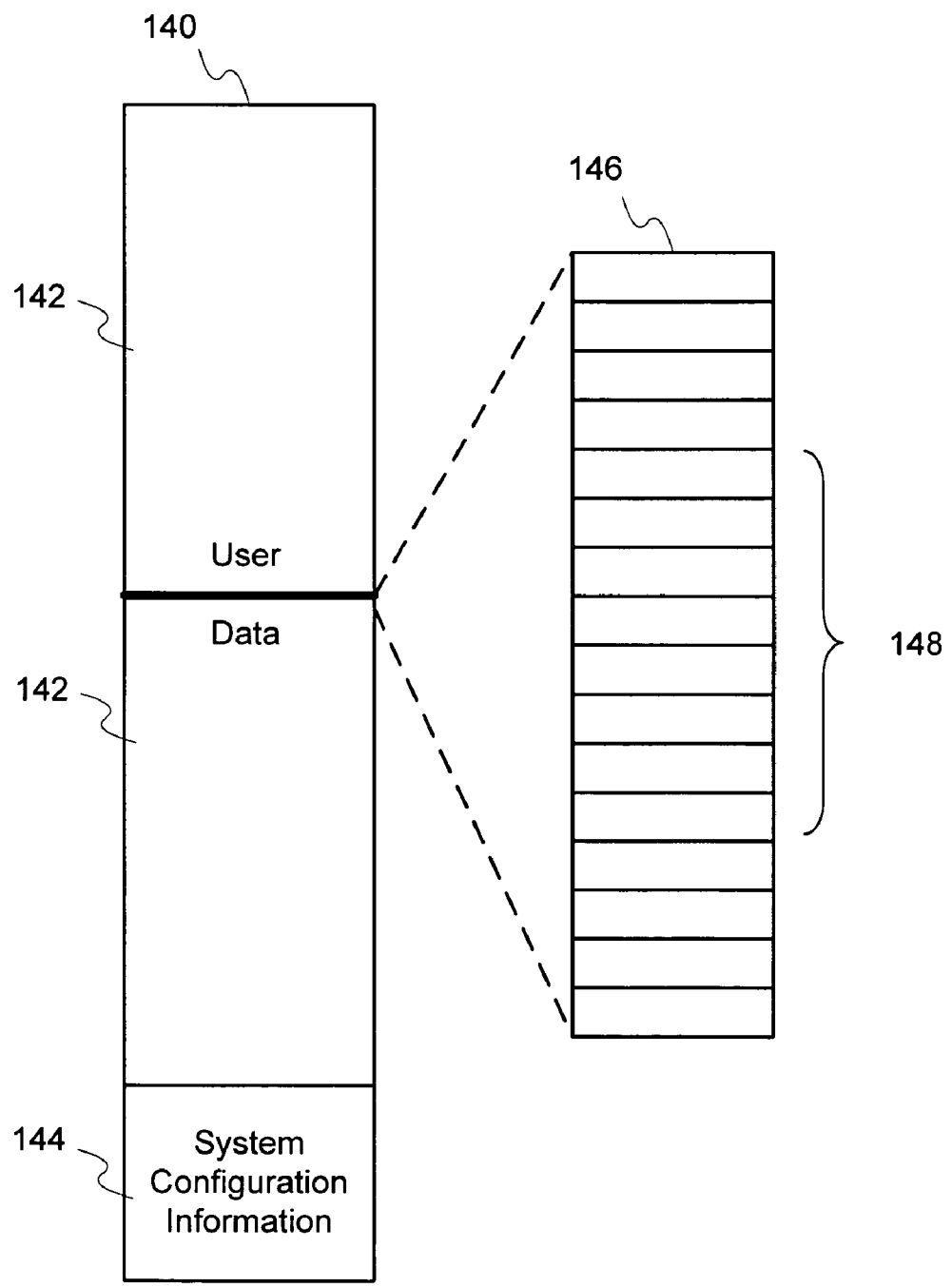
FIG. 5 diagrammatically depicts a drive array storage map and grid storage architecture FIG. 6 diagrammatically illustrates metadata in the form of a storage allocation map (SAM) and storage allocation descriptor (SAD).

FIG. 5 depicts an array map 140 of a grid storage architecture. The array map 140 represents the storage capacity of an array 104, which is used for storing either user data 142 or system configuration information 144. Preferably, the array map 140 represents a plurality of storage grids 146, each having a predetermined storage capacity made from some or all of the data storage devices 101 in the array 104. Preferably, in order to optimize fault tolerance schemes, the grid 146 comprises an allocatable amount of storage distributed across each of a plurality of the data storage devices 101 in an array 104.

A grid 146 containing only user data 142 is termed a storage unit (SU). Fault tolerance can be provided for data stored in an SU through redundant information, such as parity data or mirror data, which is preferably stored in other grids 146. An SU that is associated with fault tolerance information contained in one or more other grids 146 is termed a "reliable storage unit" (RSU). For purposes of this description and the appended claims, the term "SU" contemplates a preselected user data storage capacity with or without associated fault tolerance information. That is, the term "SU" can mean an SU containing user data without any associated fault tolerance information, and the term "SU" can in equivalent alternative embodiments mean an RSU.

A plurality of grids 146 can be grouped into a grid group (sometimes referred to as a "sheet") 148. Preferably, the sheet 148 can be allocated to a logical device (LD), and individual grids 146 within the allocated sheet 148 can further be assigned/unassigned to/from the LD in response to system configuration change requests. Grids 146 in the array map 140 can be sequentially numbered or otherwise assigned a number or identifier that uniquely identifies them. As such, the array map 140 can be viewed as comprising a plurality of sheets 148, with each sheet 148 comprising a plurality of grids 146. User data 142, including redundant data, if any, and system configuration information 144 can be stored within the grids 146, and thus within the sheets 148.

A plurality of array maps 140 can be employed if the system 100C has a plurality of arrays 104 or other organization of data storage devices 101. For such a plurality of arrays 104, system metadata can be stored in one or more arrays 104. FIGS. 6-9 that follow depict illustrative embodiments of metadata for the grid-based data storage system of FIG. 5 that can be employed to allocate storage capacity and/or access system configuration information within the storage capacity.

Figure 6:
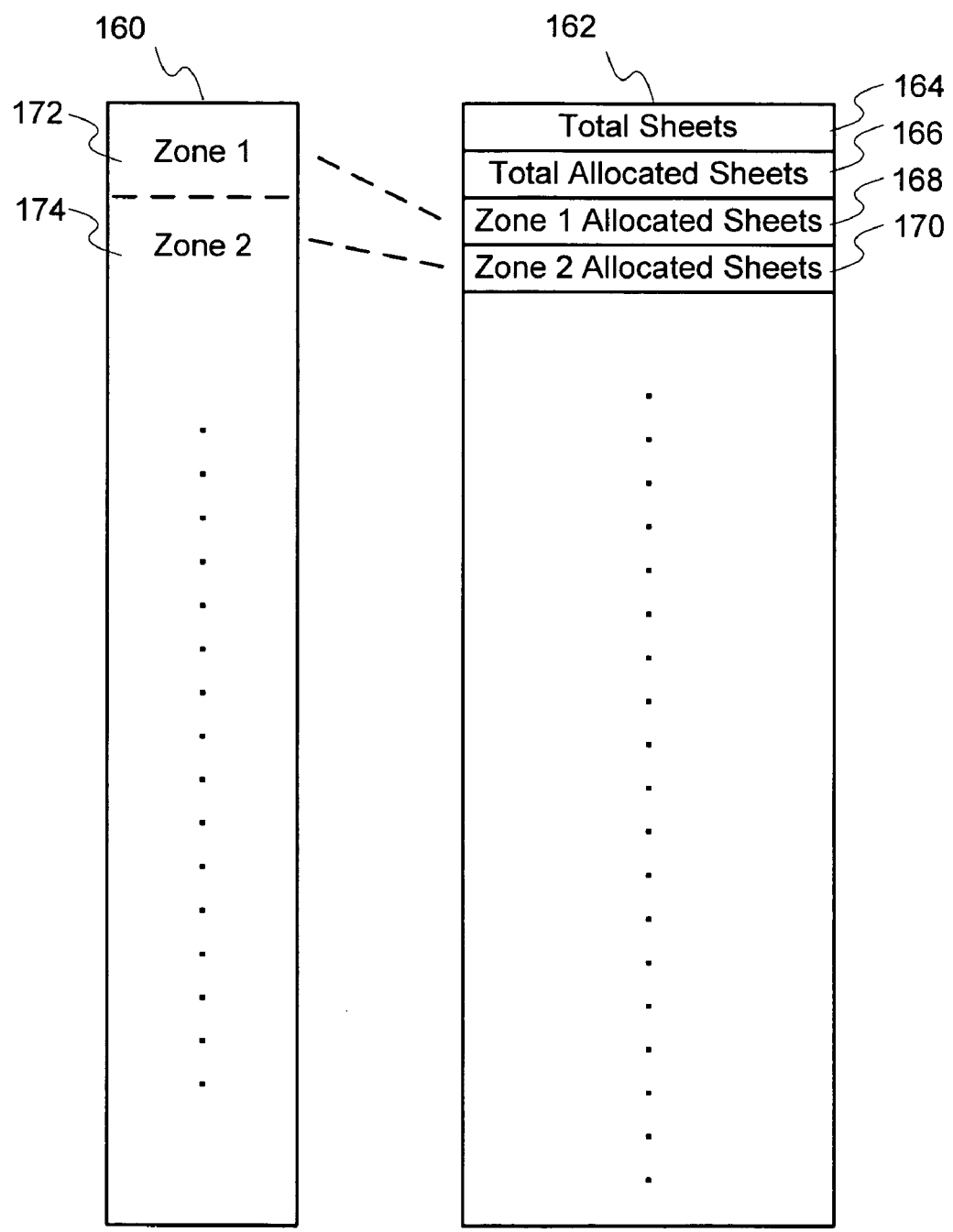

FIG. 6 diagrammatically illustrates a storage allocation map (SAM) 160 and a storage allocation descriptor (SAD) 162. Preferably, the SAM 160 is an array having one indicator bit for each sheet 148 in the array map 140 (FIG. 5). The bit for a sheet 148 is set to a first value if the respective sheet 148 is allocatable, and is set to a second value if the respective sheet 148 has been allocated to an LD. Restated, SAM 160 is a map designating where allocatable sheets 148 exist in an array 104. The SAD 162 provides a summary of the information contained in the SAM 160. For example, the SAD 162 can include a count of the total number of sheets 164 and the number of allocatable sheets 166 in the SAM 160. The SAD 162 can also provide a summary of the total number of allocatable sheets 168, 170 within predefined zones 172, 174 of the SAM 160. For example, zone 1 allocatable sheets 168 contains the number of allocatable sheets 148 within zone 1 (172) of the SAM 160. By checking the number of allocatable sheets 148 within a zone 172, 174, the location of free storage capacity can be determined more efficiently than by parsing the SAM 160.

Figure 7:
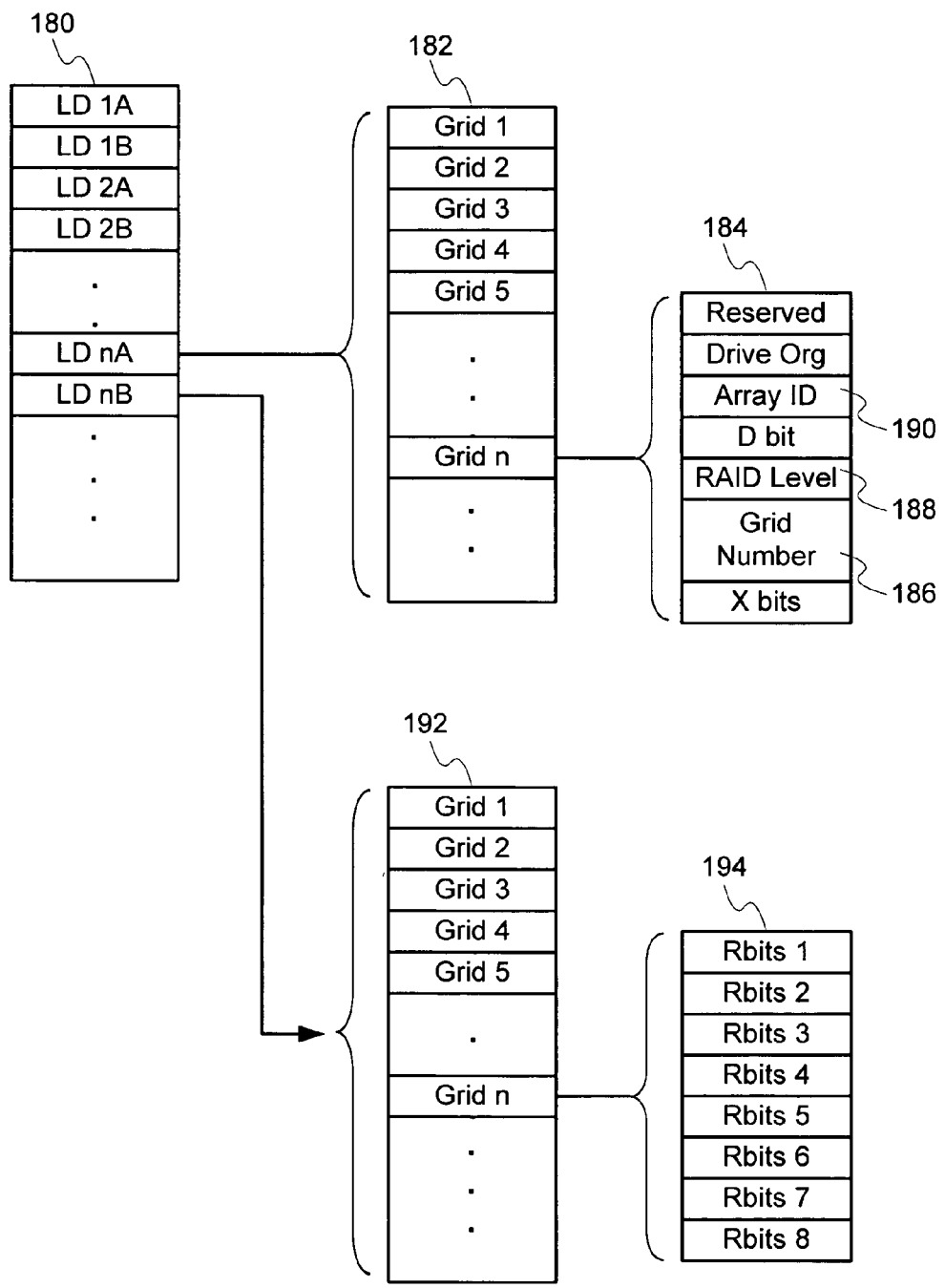
FIG. 7 diagrammatically depicts metadata in the form of a logical device allocation map (LDAM).

FIG. 7 depicts metadata utilized in allocating storage capacity to a designated LD in a grid-based data storage system. The metadata comprises a logical device allocation map (LDAM) 180 that has a corresponding logical device grid table (LDGT) 182 for each LD listed in the LDAM 180. As previously noted, sheets 148 can be allocated to an LD and grids 146 within the sheet 148 assigned to the LD.

The LDGT 182 is a listing of grids 146 assigned to the respective LD. In some embodiments the LDAM 180 can be implemented as a flat map with an offset into the map determined from an LD number to locate the LDGT 182 for that LD number. Alternatively, the LDAM 180 can be implemented as a list of indices each pointing to an LDGT 182. Other addressing methods can be used as well. The LDAM 180 is not limited to a specific number of LDGTs 182.

Each LDGT 182 can include a grid entry descriptor 184 that specifies a grid number 186, and can contain additional information such as RAID level 188, array ID 190 (such as if the storage system comprises a plurality of arrays 104) and other information, such as illustrated. The LDAM 180 can also contain an RBit Array (RBA) 192 for each LD that contains RBits 194 that can be employed to indicate if a portion of a grid 146 has been accessed or utilized. For example, Rbits 194 can be employed to indicate if a portion of a grid 146 has been copied.

Figure 8:
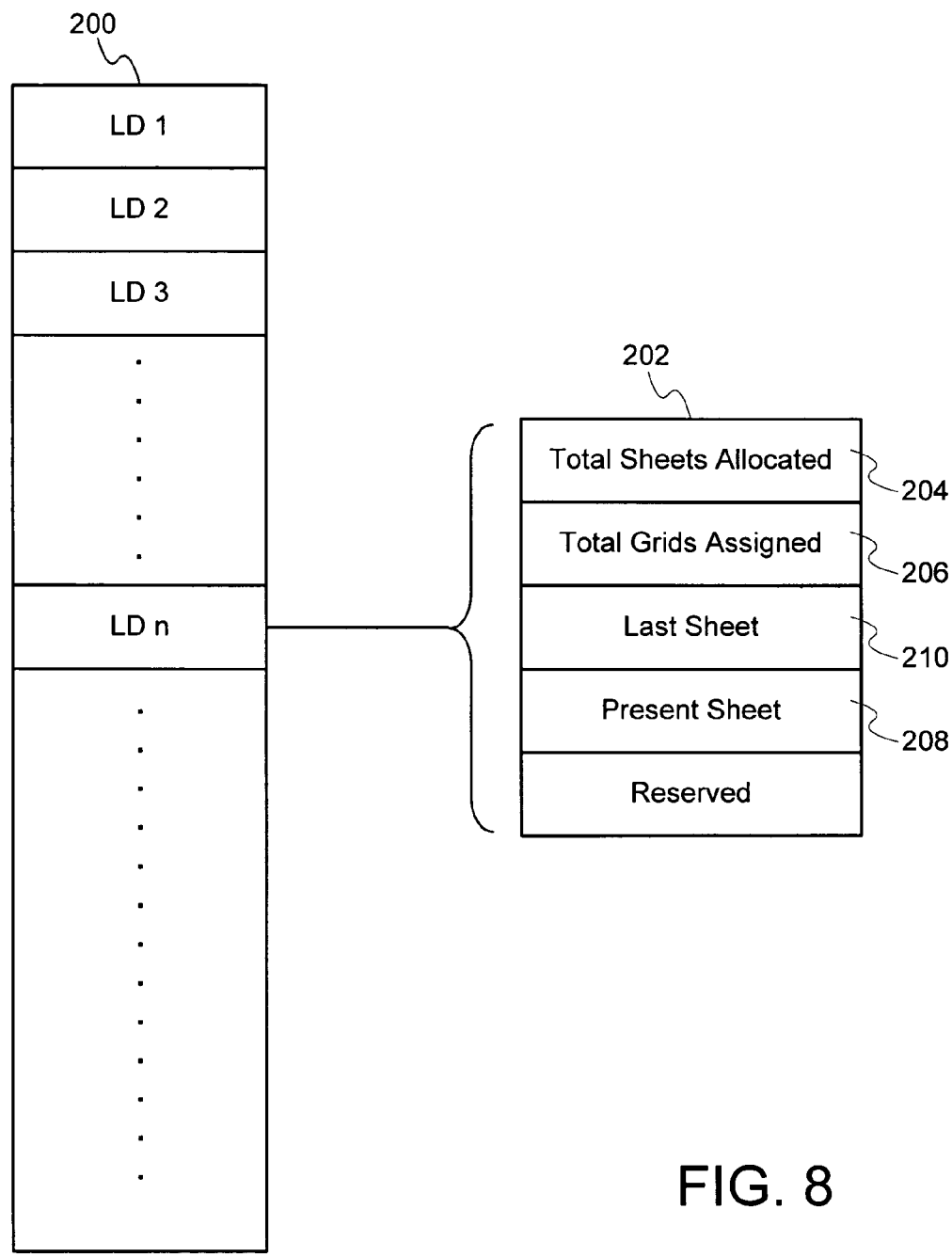
FIG. 8 diagrammatically depicts metadata in the form of a logical device allocation descriptor array (LDAD).

FIG. 8 depicts a logical device allocation descriptor array (LDAD) 200, which provides summary information of the sheets 148 allocated and the grids 146 assigned to a particular LD. The LDAD 200 can comprise a flat map where an offset into the map is determined from an LD number to access LDAD contents 202 for a given LD. The LDAD contents 202 can comprise a count of the number of sheets allocated 204 to the LD, a count of the number of grids assigned 206 to the LD, and can include other information such as present sheet 208 and last sheet 210, as can be employed for assigning additional grids 146 from allocated sheets 148 or for de-allocating grids 146, for example.

Figure 9:
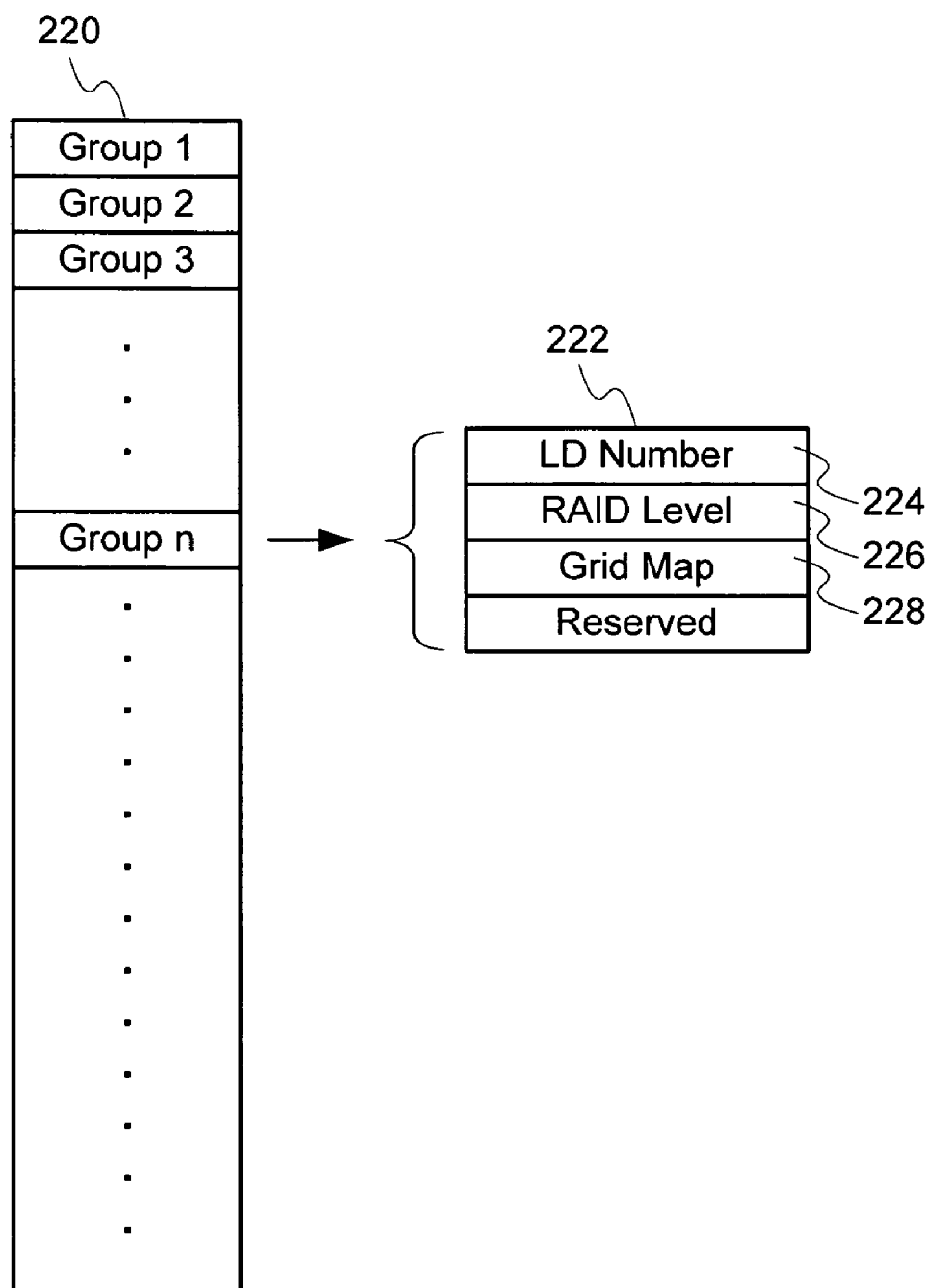
FIG. 9 diagrammatically depicts metadata in the form of a grid group allocation table GGAT).

FIG. 9 further depicts metadata comprising a grid group allocation table (GGAT) 220. In some embodiments GGAT 220 can be a flat map with an offset into the map determined from a sheet number to locate a respective GGAT entry 222. Each GGAT entry 222 can contain an LD number 224 to which the sheet 148 is allocated (or another number indicating that the sheet 148 has not been allocated), can include a RAID level 226 for the sheet 148, and can contain a grid map 228 indicating which grids 146 within the sheet 148 have been assigned to the LD.

Figure 10:
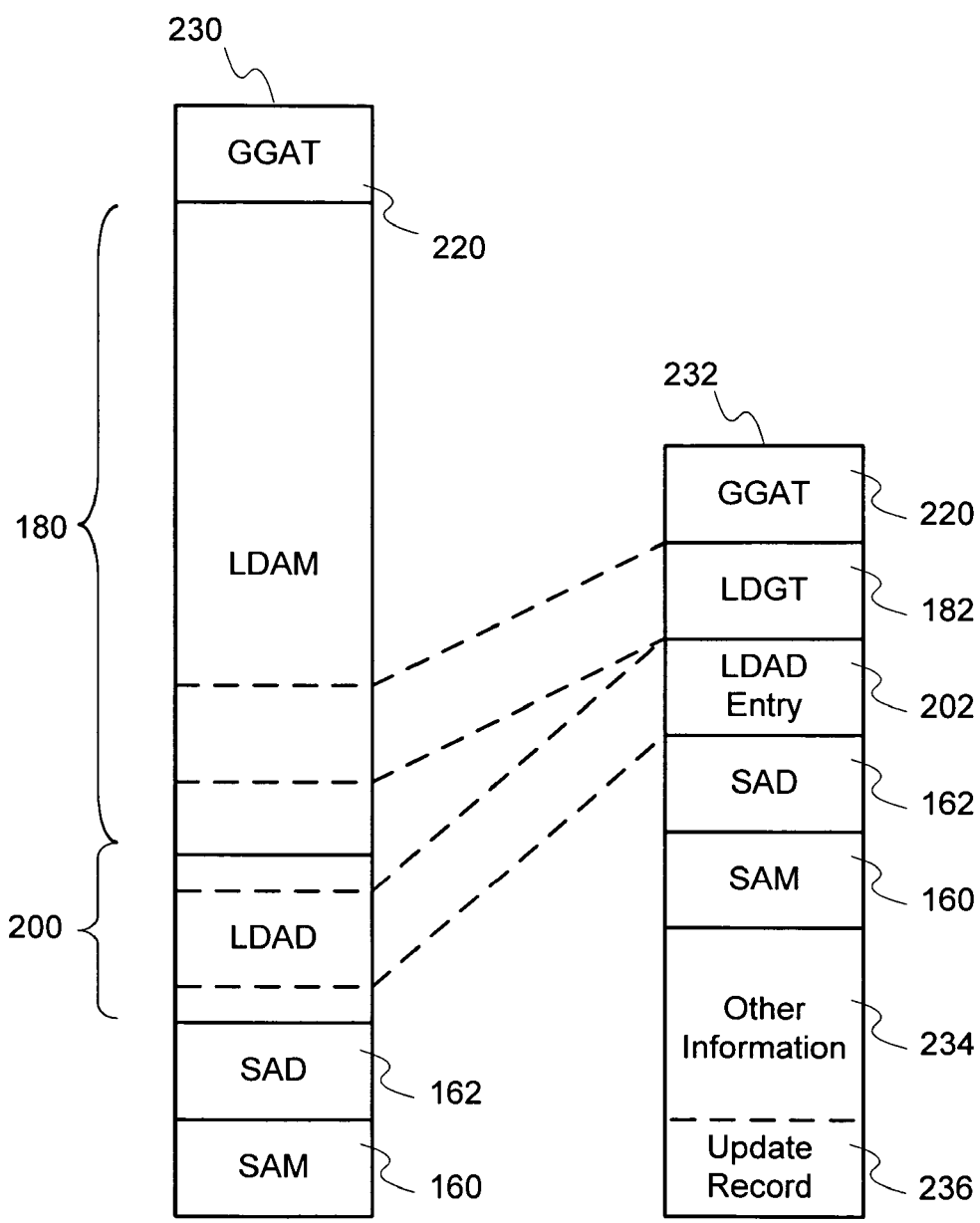
FIG. 10 diagrammatically depicts metadata stored within the system configuration information area of a drive array and metadata and portions of metadata stored in memory.

When system configuration information is updated, data structures or portions of data structures, otherwise referred to as metadata, stored in array 104 are transferred to memory 134 (FIG. 4) and are then updated by processor 130. FIG. 10 depicts illustrative data structures stored within system configuration information 144 area of array 104, and data structures and portions of data structures stored in memory 134. A system configuration information map 230 can include illustrative data structures from above, such as GGAT 220, LDAM 180, LDAD 200, SAM 160 and SAD 162. A memory map 232 depicts data structures and portions of data structures copied from array 104 and stored in memory 134. The structures can include GGAT 220, LDGT 182 for a specified LD, LDAD entry 202 for the specified LD, SAM 160, and SAD 162. Memory 134 can also contain other information 234 that can include an update record 236.

The update record 236 can comprise memory allocation information comprising that portion of the candidate system configuration information that is changed as a result of completing the configuration update request. The memory allocation information can be combined with the prior state of the system configuration information to obtain the subsequent state of the system configuration information. Alternatively, the subsequent state of the system configuration information can be ascertained by viewing the prior state of the system configuration information as modified by the memory allocation information.

Processor 112 identifies the candidate system configuration information associated with the configuration change request, by determining which data structures, or portions thereof, are paged into memory 134. FIG. 10 is merely illustrative of applicable system configuration information. The format of this information can vary depending on the storage system configuration. Data structures can be stored in memory 134 in an order other than that depicted.

Figure 11:
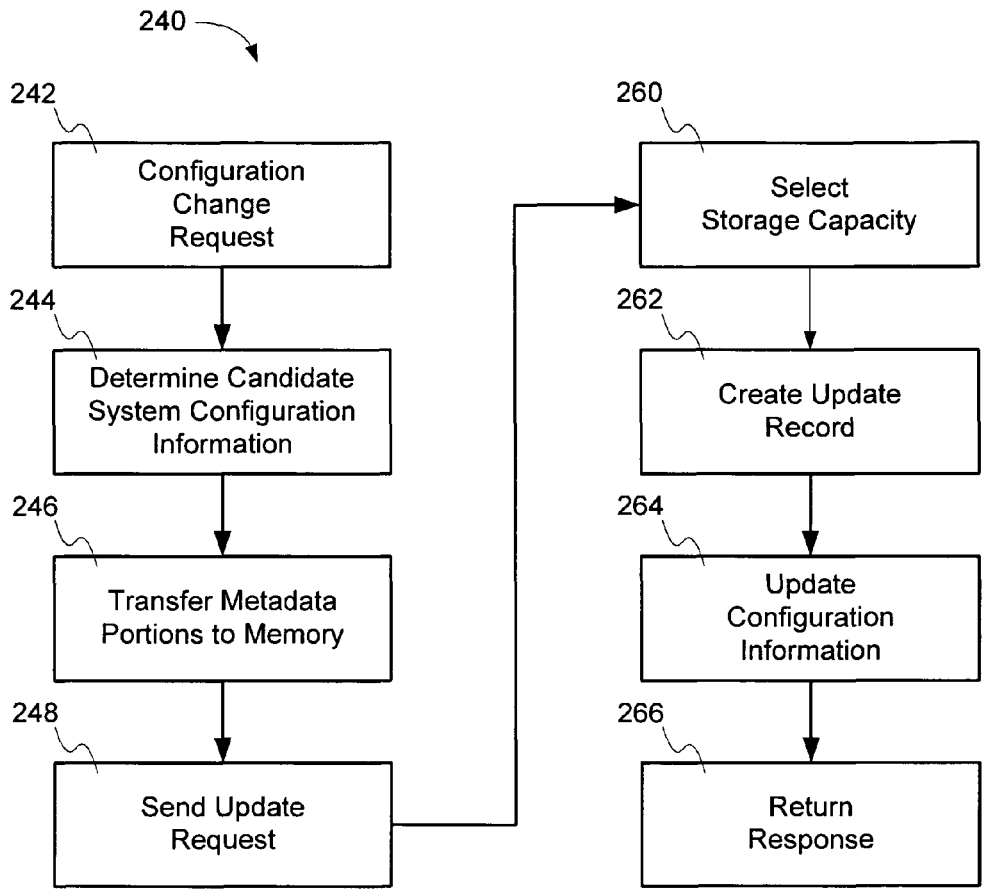
FIG. 11 is a flowchart illustrating steps for practicing a method of allocating storage capacity in accordance with embodiments of the present invention.

FIG. 11 illustrates a method 240 for updating system configuration information in accordance with embodiments of the present invention. It will be recalled that the term "allocation" includes both allocating storage capacity, such as when saving a file to memory, and deallocating storage capacity, such as when deleting a file from memory. At step 242 the processor 112 detects a configuration change request, such as might be associated with events such as a request that a new LD be created, a request that the size of an existing LD be increased, a request to change the data storage format of an existing LD to a format utilizing greater storage capacity, or the like. For purposes of illustration, the following will assume the configuration change request is associated with a request for creating a new LD.

At step 244 the processor 112 selects candidate system configuration information stored in array 104 that will include the system configuration information affected by processing the configuration change request. This can include selecting an LDGT 182 from LDAM 180 and LDAD entry 202 from LDAD 200 using the LD number of the LD to be created. At step 246 the candidate system configuration information stored in array 104 is transferred to memory 134 under control of processor 112. This can comprise programmed I/O, programming a DMA controller, configuring or instructing another processor to perform the transfer, or any other transfer methods. In some embodiments memory 134 is a cache memory and the candidate system configuration information is paged into the cache.

Figure 12:
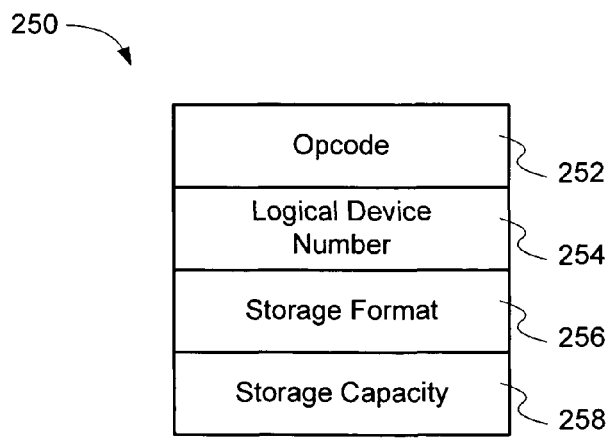
FIG. 12 diagrammatically depicts a configuration update request packet.

At step 248 an update request is created, such as by processor 112, and issued to processor 130. The update request specifies the type of operation to be performed by processor 130 and can be in the form, as illustrated in FIG. 12, of a request packet 250 containing an opcode 252, an LD number 254, a storage format identifier 256, and an amount of storage to be allocated 258. From the opcode and/or other information contained in the update request, processor 130 determines the operational steps necessary to perform an allocation in satisfying the configuration change request.

At step 260 the processor 130 identifies allocatable storage capacity that is sufficient to satisfy the configuration change request, such as by reading allocatable grid group zone counts 168, 170 (FIG. 6) contained within SAD 162. This permits an efficient manner of identifying one or more zones of the SAM 160 from which sheets 184 with sufficient allocatable storage capacity exists. One or more sheets 184 corresponding to "allocatable" bits within the SAM 160 are selected. The position of each bit within the SAM 160 corresponds to a sheet number. The number of the first grid 146 within a sheet 148 can be determined by multiplying the sheet number by the number of grids 146 in a sheet 148 and adding an offset, if any.

At step 262 an update record can be created. For example, for each sheet 148 selected in step 260, a GGAT entry 222 is created and stored in update record 236 (FIG. 10). Grids 146 from selected sheets 148 are then assigned to the LD. Depending on the amount of storage requested, one or more sheets 148 can be selected and some or all of the grids 146 within a sheet assigned to the LD. An LDGT 182 for the LD that contains the grid number 186 is created and stored in update record 236 (FIG. 10). Updated values for SAM 160 and SAD 162, reflecting the allocation of one or more sheets 148, are calculated and stored in update record 236. The update record 236 can be in the form of a recovery record, which is useful in providing an idempotent update of the configuration information if the updating process is interrupted during execution.

At step 264 the processor 130 updates system configuration information data structures stored in memory 134 using the update record 236. Preferably, this updating is an atomic process that is not interrupted by any other process. For example, in some embodiments the processor 130 disables processing of input-output interrupts during the updating process. At step 266 the processor 130 can return a completion response to processor 112 indicating that the update request has been processed.

FIG. 11 illustrates steps performed to allocate storage capacity using two processors. A configuration update request packet can be employed for a range of operations that can include, but are not limited to, creation of a new LD, increasing the size of an existing LD, converting the format of an LD, reducing the size of an LD, and deleting an LD. As discussed above, the steps of the method 240 can likewise be performed in deallocating storage capacity.

FIG. 12 depicts an illustrative update request packet 250 that can be sent to the processor 130. The update request 250 can be of a predefined size or can be of variable size depending upon the type of operation. Opcode 252 comprises a value designating the type of operation to be performed. Table 1 below illustrates exemplary opcodes.

TABLE 1

| Opcode | Operation |
|--------|-----------|
| 0x0000 | Illegal/Reserved OpCode |
| 0x0001 | Create New LD |
| 0x0002 | Expand Existing LD |
| 0x0003 | Reduce Existing LD |
| 0x0004 | Delete LD |
| 0x0005 | Convert LD Format |

Other opcodes 252 can be defined for other operations. LD number 254 can comprise an LD number or other LD identifier. Storage format 256 specifies the storage format that can include, but is not limited to, RAID formats. Storage capacity 258 specifies an amount of storage to be allocated. Storage capacity 258 can be specified in blocks, bytes, grids, grid groups, or other units.

Advantageously, embodiments of the present invention provide a system and method for updating system configuration information that reduces the workload on a first processor by performing some tasks on a second processor. Preloading a memory accessible by the second processor with configuration information to be updated allows updates to be performed in an atomic manner since no other I/Os are required. Computer program code for the second processor can be simplified by transferring types of system configuration information to predefined locations within the cache memory. Frequently accessed system configuration information, such as SAM 160 and SAD 162, for example, can be kept resident in the cache. Use of a write-back cache memory allows updated system configuration information to be quickly available to the system for file access without the delay of I/Os to write configuration information back to the array.

Accordingly, very efficient and atomic methodology for manipulating metadata is provided by the embodiments of the present invention. Preferably, the metadata can be highly organized in the write-back cache memory. Some elements of the metadata can be preloaded and always existent, while other elements can be paged into cache as needed by high level policy software. The high level policy software determines what metadata is needed in cache, and then coordinates the I/Os to accomplish the determination. Then the high level policy software can issue the request packet in very dense form (such as virtualization active context entry (VACE)) to the operational processor (such as MAP). The operational processor carries out the actual metadata manipulation, updating discontiguous pieces of metadata with only memory references, and without needing to understand how the high level policy software will use the metadata changes. The atomicity is achieved by processing only a single metadata update at a time, which is possible because by definition no I/Os are necessary for the operational processor to perform a request.

While the preceding examples illustrate configuration information updates related to allocation of storage capacity, configuration change requests can be employed to update other system configuration information including but not limited to hardware device configuration and software configurations, such as passwords, for example.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular metadata structure without departing from the spirit and scope of the present invention.

What is claimed is:

1. A method of updating system configuration information in response to a configuration change request, comprising:
    identifying candidate system configuration information associated with the configuration change request by a first processor;
    sending an update request incident with the configuration change request to a second processor; and
    updating the candidate system configuration information by the second processor in response to the update request and independently of the first processor.

2. The method of claim 1 wherein the candidate system configuration information is resultant data associated with a state of a portion of the system configuration information prior to the configuration change request.

3. The method of claim 2 comprising, subsequent to the identifying step, transferring the candidate system configuration information to a memory accessible by the second processor.

4. The method of claim 3 wherein the memory comprises a write back cache.

5. The method of claim 2 wherein the updating step comprises disabling processing step input-output interrupts in the second processor.

6. The method of claim 2 wherein the identifying step comprises parsing the system configuration information according to a logical device associated with the configuration change request.

7. The method of claim 6 wherein the candidate system configuration information comprises a list of storage units allocated to the logical device.

8. The method of claim 2 wherein the candidate system configuration information comprises a bitmap defining an allocatability of one or more storage units of the memory space.

9. The method of claim 2 wherein the updating step comprises defining memory allocation information as that portion of the candidate system configuration information that is changed in response to the configuration update request.

10. The method of claim 9 comprising combining the system configuration information and the memory allocation information to reflect a changed state of the system configuration information associated with the configuration change request.

11. A data storage system comprising:
    system configuration information associated with allocation of a memory space;
    a first processor adapted for identifying a portion of the system configuration information in response to a configuration change request to the memory space; and
    a second processor adapted for updating the portion in response to an update request incident with the configuration change request and independently of the first processor.

12. The system of claim 11 wherein the portion comprises resultant data associated with a partial state of the system configuration information prior to the configuration change request.

13. The system of claim 12 comprising a memory accessible by the first and second processors to which the portion is transferable.

14. The system of claim 13 wherein the memory comprises a write back cache.

15. The system of claim 12 wherein the second processor is adapted for disabling processing step input-output interrupts while updating the portion.

16. The system of claim 12 comprising a logical device allocation map that is parseable by a logical device number associated with the configuration change request for determining the portion.

17. The system of claim 12 wherein the portion is characterized by a bitmap defining an allocatability of one or more storage units of the memory space.

* * * * *